(12) United States Patent
Backhaus et al.

(10) Patent No.: US 10,616,391 B2
(45) Date of Patent: *Apr. 7, 2020

(54) SYSTEM AND METHOD FOR PROVISION OF A SECOND LINE SERVICE TO A TELECOMMUNICATIONS DEVICE

(71) Applicant: Movius Interactive Corporation, Duluth, GA (US)

(72) Inventors: George Backhaus, Suwanee, GA (US); Philip Lowman, Ellijay, GA (US); Jingnesh Gandhi, Duluth, GA (US); Julio Gonzalez, Tucker, GA (US); John Green, Roswell, GA (US); Paul Rubenstein, Johns Creek, GA (US); Mike Speanburg, Lawrenceville, GA (US)

(73) Assignee: Movius Interactive Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,781

(22) Filed: Sep. 26, 2019

(65) Prior Publication Data

US 2020/0028954 A1   Jan. 23, 2020

Related U.S. Application Data

(63) Continuation of application No. 16/168,824, filed on Oct. 23, 2018, now Pat. No. 10,477,001, which is a
(Continued)

(51) Int. Cl.
*H04Q 3/76* (2006.01)
*H04M 1/57* (2006.01)
(Continued)

(52) U.S. Cl.
CPC ........ *H04M 1/57* (2013.01); *H04M 3/42042* (2013.01); *H04M 3/42059* (2013.01);
(Continued)

(58) Field of Classification Search
None
See application file for complete search history.

(56) References Cited

U.S. PATENT DOCUMENTS 5,467,390 A * 11/1995 Brankley ............ H04M 3/4228
379/221.08
6,771,761 B1 * 8/2004 LaPierre ........... H04M 3/42229
379/207.11
(Continued)

*Primary Examiner* — Harry S Hong
(74) *Attorney, Agent, or Firm* — Smith Tempel Blaha LLC; Gregory Scott Smith

(57) ABSTRACT

A method and system for providing a second line service ("SLS") feature to a subscriber using a telecommunications device ("TD") which includes receiving at a switch on the network of the subscriber's primary service provider a communication made up of a trigger and a directory number. When the communication is received at the primary service provider's switch, the switch parses the communication and detects the trigger. Once the switch has received the communication, the switch additionally transmits a query message to a SLS platform that manages the SLS feature. As a result of the switch's query message transmission, the switch receives a reply to the query message from the SLS platform. Based at least in part on the reply to the query message, the switch can route the communication such that the switch connects one or multiple voice channel circuit between the subscriber's TD and the terminating TD.

9 Claims, 4 Drawing Sheets

Related U.S. Application Data continuation of application No. 15/470,867, filed on Mar. 27, 2017, now Pat. No. 10,142,710, which is a continuation of application No. 14/876,614, filed on Oct. 6, 2015, now Pat. No. 9,648,165, which is a continuation of application No. 14/307,407, filed on Jun. 17, 2014, now Pat. No. 9,185,628, which is a continuation-in-part of application No. 12/133,996, filed on Jun. 5, 2008, now abandoned.

(60) Provisional application No. 61/836,145, filed on Jun. 17, 2013.

(51) Int. Cl.
*H04M 3/42* (2006.01)
*H04M 3/533* (2006.01)
*H04W 4/16* (2009.01)
*H04Q 3/00* (2006.01)
*H04M 3/46* (2006.01)
*H04W 40/02* (2009.01)

(52) U.S. Cl.
CPC ......... *H04M 3/42102* (2013.01); *H04M 3/46* (2013.01); *H04M 3/53316* (2013.01); *H04Q 3/0029* (2013.01); *H04Q 3/76* (2013.01); *H04W 4/16* (2013.01); *H04W 40/02* (2013.01); *H04M 3/53366* (2013.01); *H04M 2207/12* (2013.01); *H04Q 2213/13345* (2013.01); *H04Q 2213/13546* (2013.01); *H04Q 2213/345* (2013.01)

(56) References Cited

U.S. PATENT DOCUMENTS

| | | | |
|---|---|---|---|
| 9,185,628 B2* | 11/2015 | Lowman | H04Q 3/76 |
| 9,648,165 B2* | 5/2017 | Backhaus | H04Q 3/76 |
| 10,142,710 B2* | 11/2018 | Backhaus | H04M 3/46 |
| 10,477,001 B2* | 11/2019 | Backhaus | H04M 3/42042 |
| 2003/0147519 A1* | 8/2003 | Jain | H04M 3/42008 379/211.02 |
| 2009/0304170 A1 | 12/2009 | Bettis | |
| 2015/0079998 A1* | 3/2015 | Lowman | H04M 3/42102 455/445 |
| 2016/0028887 A1* | 1/2016 | Backhaus | H04Q 3/76 455/415 |
| 2017/0201809 A1* | 7/2017 | Backhaus | H04M 1/57 |
| 2019/0109933 A1* | 4/2019 | Backhaus | H04M 3/42042 |

* cited by examiner

SYSTEM AND METHOD FOR PROVISION OF A SECOND LINE SERVICE TO A TELECOMMUNICATIONS DEVICE

CROSS-REFERENCE

This application is a continuation of the United States application for patent that was filed on Oct. 23, 2018 and assigned Ser. No. 16/168,824, which application is a continuation of the United States application for patent that was filed on Mar. 27, 2017 and assigned Ser. No. 15/470,867, which application is a continuation U.S. patent application Ser. No. 14/876,614 filed on Oct. 6, 2015, now U.S. Pat. No. 9,648,165, which application is a continuation of the United States application for patent that was filed on Jun. 17, 2014 and assigned Ser. No. 14/307,407, now U.S. Pat. No. 9,185,628, which application is a continuation-in-part of the United States Application for patent filed on Jun. 5, 2008, bearing the title of DIRECT DIAL TO VOICE MAIL and assigned Ser. No. 12/133,996, which is now abandoned, and which application claims priority from the United States provisional application for patent under 35 U.S.C. § 119(e) which was filed on Jun. 17, 2013 and assigned Ser. No. 61/836,145. Each of the above-referenced applications, as well as any documents they incorporate by reference, are hereby incorporated by reference in their entirety.

BACKGROUND

In simpler times, communication meant a face-to-face conversation, a hand written note or, perhaps, a phone call between two landlines. Times have changed. People today communicate constantly and simultaneously via myriad channels, most of which are mobile. Of all the means of communication available to today's users, the cellular telephone may be the most ubiquitous. It seems that everybody has one and that everybody uses their mobile device to stay connected, keep their busy lives moving forward, and fulfill their endless responsibilities.

For many people, those endless responsibilities are of a personal and professional mix. Fielding phone calls and texts from family and friends on the same mobile device from which you endeavor to conduct business is a recipe for confusion. To keep the personal and business channels of communication separated, many people simply carry two separate mobile devices, each with its own dedicated phone number and service options. If mobile device "A" rings, the user knows it's of a personal nature. If mobile device "B" rings, the user knows that it's a business related call. Although carrying two mobile devices with you is one solution for keeping personal and business demands separate, keeping track of two mobile devices and their related service plans, however, can be frustrating and expensive.

For many users, porting a second phone number to a single device makes more sense—in doing so, at least the number of devices that must be kept up with in order to keep personal and business matters segregated have been reduced. But current systems and methods for managing multiple numbers on a single device are not without issues. For example, adding a second line to a service plan often dictates that the user have a more expensive "family plan" established with the service provider and often there still is no good way to know which number a calling party has dialed. Using a dual-SIM ("subscriber identity module") phone is another solution, with each SIM card being dedicated to a separate line, but the cost of redundant service plans to accommodate the multiple SIM cards, not to mention the cost of the dual-SIM phone itself, can be exorbitant.

Accordingly, what is needed is a system and method for providing a plurality of dedicated phone numbers to a single telecommunications device in such a manner that the user of the device can separate and manage communications on each.

SUMMARY OF THE DISCLOSURE

A method and system are described for providing a plurality of dedicated phone numbers to a single telecommunications device. Through this method and system, the user of the single communication device can separate and manage communications directed to multiple phone numbers without the need of having multiple telecommunications devices or, having multiple SIM cards with each such card being dedicated to the individual phone numbers. The plurality of phone numbers are provisioned or associated with a single telecommunications device by providing a second line service feature. It should be appreciated that although the various embodiments, including various features and aspects, is referred to as a "second line service", the various embodiments may include more than just a second line and in fact, any number of additional lines may be enabled or associated for a single telecommunications device. By subscribing to this second line service feature, the user overcomes the problems and needs described above as well as other shortcomings in the art.

An exemplary method, according to one embodiment, can be implemented in an environment in which a subscriber to the second line service operates within the network of the subscriber's service provider. A network switch receives a communication originating from the subscriber's telecommunication device when the subscriber initiates a request to establish a call. The communication may include, among other things, a trigger and a directory number to identify the destination or intended recipient of the call. When the network communication is received at the primary service provider's switch, the switch parses the network communication and detects the trigger. Notably, the switch's parsing of the communication can involve the switch recognizing that the trigger is one of a variety of trigger configurations including, but not limited to, (a) at least a one digit prefix, (b) at least a one digit suffix, (c) simply, at least one additional digit, or (d) a combination of any two or more of these, all in addition to the directory number. It should be appreciated that in this, as well as other embodiments, the trigger, rather than being a separate digit, may actually be derived from the dialed number itself.

Once the switch has received the network communication and recognized the trigger, the switch then transmits a query message to a second line service platform that manages the second line service feature. The second line service platform may be identified or selected based on the trigger, the telephone number associated with the originating telecommunications device, the dialed number, or a combination of two or more of these and other elements. This query message is based at least in part on how the switch is configured to handle the detection and processing of the trigger. As a result of the switch's query message transmission, the switch receives a reply to the query message from the second line service platform. The reply to the query message can include information indicating how to interpret the communication's embedded directory number and information for routing the communication to the correct terminating destination. Based at least in part on the reply to the query message, the switch can route the network communication such that the switch connects one or multiple voice channel circuits between the subscriber's telecommunications device and one or more terminating telecommunications devices. The second line service platform, upon receiving the query may determine that the call origination is intended to be associated with one of the subscriber's second numbers. The determination can be based on the trigger, the dialed number or a combination of this information as well as other information. As such, the reply to the query message from the second line service platform can additionally include the intended second line service number of the subscriber's telecommunications device. The switch can then operate to populate the caller ID field of the call being established with the received second line number. Thus, the receiving party will receive not only the call, but also the identification of the second line number associated with the origination of the call once the network communication is properly routed.

In another embodiment, the switch at the primary service provider may receive a communication that at least includes a trigger and a directory number. Further, the network communication can originate from the subscriber's mobile telecommunications device and can be transmitted to the switch through a mobile telephone switching office. When the network communication is received at the primary service provider's switch, the switch recognizes the directory number (i.e., a 10 digit telephone number embedded within the communication), and recognizes that the trigger, also embedded within the communication, is a request to route the network communication using the second line service feature. Notably, the switch's recognition of the trigger can involve the switch recognizing at least a one digit prefix, suffix, embedded number or a combination thereof in addition to the directory number.

Once the switch has received the network communication and recognized the trigger, the switch then transmits a query message to the second line service platform managing the second line service feature. This query message is based at least in part on how the switch is configured to handle the detection and processing of the trigger. Notably, transmission of the query message from the switch can involve the switch executing a programmed command to send a message to the second line service platform. The transmission of the query message from the switch can additionally involve holding the network communication until the second line service platform responds to the query message. Holding the network communication includes, among other things, delaying or preventing the actions necessary to complete the call through the network to the intended recipient or terminating device. In some embodiments, once the switch detects the trigger and knows that the SLS platform involvement is necessary (or information is required of the SLS platform) then the call processing can be paused until such information is received from the SLS platform. In other embodiments, the call processing can continue and then when updated information is received from the SLS platform, this information may be used to augment or modify the information provided to the terminating device.

As a result of the switch's query message transmission, the switch receives a reply to the query message from the second line service platform. The reply from the second line service platform may include information identifying how to interpret the directory number embedded in the communication and information for routing the communication to the correct terminating destination. Based at least in part on the reply to the query message, the switch can route the network communication such that the switch connects one or multiple voice channel circuits between the subscriber's telecommunications device and one or more terminating telecommunications devices. In formulating the reply to the query message, the second line service platform may identify the second line number to be associated with the call and then, to include or identify the second line service number in the reply. Once received the switch can populate caller ID of the call with the second line service number. Thus, the receiving device will recognize the call as coming from the second line once the network communication is properly routed.

Another embodiment of the second line service operates within a roaming environment.

In this embodiment, a network communication, originating from a subscriber's mobile telecommunication device, is received at the switch of the primary service provider. The network communication may include, among other things, a trigger and a directory number. In this particular embodiment, the telecommunication device originating the call is roaming on a different telecommunications network. When the network communication is received at the primary service provider's switch, the switch recognizes the directory number, which is a 10 digit telephone number embedded within the communication, and recognizes that the trigger, also embedded within the communication, is a request to route the network communication using the second line service feature. Notably, the switch's recognition of the trigger can involve the switch recognizing at least a one digit prefix, suffix, embedded entry or a combination thereof in addition to the directory number.

Once the switch has received the network communication, the switch then transmits a query message to the second line service platform that is part of the subscriber's primary service provider's network and that manages the second line service feature. This query message is based at least in part on how the switch is configured to handle the detection and processing of the trigger. The transmission of the query message from the switch can involve the switch executing a programmed command to send a message the second line service platform. The transmission of the query message from the switch can additionally involve the switch holding the network communication until the second line service platform responds to the query message.

As a result of the switch's query message transmission, the switch receives a reply to the query message from the second line service platform. The reply can include information identifying how to interpret the communication's imbedded directory number and information for routing the communication to the correct terminating destination. Based at least in part on the reply to the query message, the switch can communicate routing instructions to the roamed-on telecommunications network. In formulating the reply, the second line service platform may identify a second line to be associated with the originating call and then include information identifying the second line number in the reply. The switch can then communicate the second line service number to the roamed-on telecommunications network for purposes of populating it into the caller ID field of the communication setup request being sent to the terminating telecommunications device.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
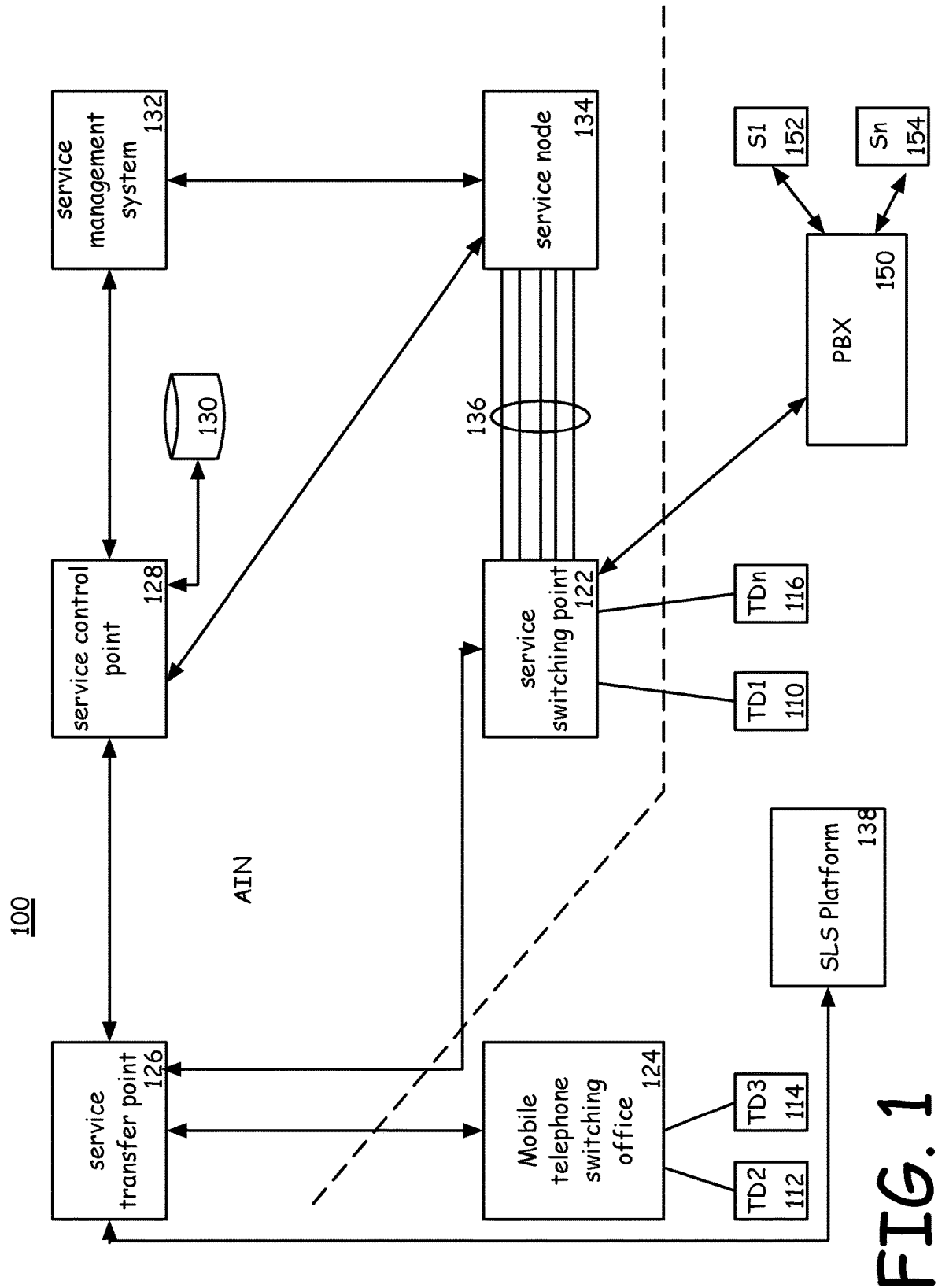
FIG. 1 is a block diagram illustrating an exemplary environment suitable for various embodiments of a system and method for providing a second line service to a subscriber using a TD.

The word "exemplary" is used herein to mean "serving as an example, instance, or illustration." Any aspect described herein as "exemplary" is not necessarily to be construed as preferred or advantageous over other aspects.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "telecommunications device," "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities. Therefore, a telecommunications device ("TD") may include a cellular telephone, a pager, a PDA, a smartphone, a navigation device, a tablet personal computer ("PC"), a hand-held computer with a wireless connection or link, etc.

In this description, the terms "call" and "communication," in their noun forms, envision any data transmission routed across a network from one device to another including, but not limited to, a voice transmission, a text message, a video message, a page, a data transmission, etc.

The present disclosure presents various embodiments, as well as features and aspects that may be included in such embodiments, of a second line service ("SLS") deployment for providing enhanced capabilities to a user of a telecommunications device ("TD"). More specifically, various embodiments of the SLS may include the dialing of a special prefix that is used to signal the telecommunications network that the presently dialed call is to be subject to special routing. For instance, in one embodiment, a calling party can call a predefined prefix, and then dial a called party's 10 digit telephone number. When the switching system, central office or other component of the telecommunications network receives the dialed sequence, the component parses or examines the received sequence of dialed numbers to compare at least portions of the sequence to known patterns, such as the predefined prefix. If the component identifies the predefined prefix within the dialed sequence, the component processes the received sequence as one for which the calling party wishes to utilize its second line service to contact the called party. In another embodiment, rather than a prefix, a suffix may be used to signal to the telecommunications network that the call is to be routed using the calling party's second line service.

Turning now to the figures in which like elements are represented by similar labels, various embodiments, as well as aspects, features and characteristics of the embodiments are presented in more detail.

FIG. 1 is a block diagram illustrating an exemplary environment suitable for various embodiments of a system and method for providing an SLS to a subscriber using a TD. The environment 100 is illustrated as operating in conjunction with or integral to a global telecommunications network and as such, a portion of a global telecommunications network including an Advanced Intelligent Network ("AIN") of a typical local exchange carrier ("LEC") is illustrated. The AIN is well known to those skilled in the art and includes a plurality of central office switches with some of the central office switches equipped with service switching points ("SSPs"). An SSP (e.g., a 5ESS, DMS, or 1AESS type central office switch) is the AIN component of a typical electronic central office switch used by a local exchange carrier. The terms "SSP" and "switch" are used interchangeably to refer to a telecommunications switch for connecting voice channel circuits.

Each SSP in the AIN serves as an originating switch for a number of subscriber lines. Generally, an originating switch is associated with and communicatively coupled with the subscriber's lines serviced by the switch. Thus, the originating switch that services a subscriber's line can be the first network element of the AIN to process communications originating on the subscriber's line.

The originating switch receives a communication originating on the subscriber line and implements further processing, such as verifying that the subscriber is authorized to use the network, supplementing/supplanting data within the communication, and routing the communication for connection with a terminating destination, such as telecommunications devices $TD_2$ 112, $TD_3$ 114, and $TD_N$ 116. For example, an SSP 122 that receives a communication from an originating station, such as telephone device $TD_1$ 110, can route the communication for connection with a terminating destination $TD_N$ 116 in accordance with the packet-switched protocol of the PSTN. The details of such communication routing are familiar to those of ordinary skill in the relevant art and as such, will not be presented in further detail.

In addition to routing, the SSP 122 may populate the calling line identification ("CLID") field, such as the CLID field in a call setup request being sent through the network to a terminating device, with the directory number associated with calling party's $TD_1$ 110, such that when the communication is received at the called party's $TD_N$ 116, the CLID may be displayed for the benefit of the called party. Notably, although various embodiments described in the present disclosure use the CLID as an example of data that may be displayed for the benefit of the called party, it will be understood that any data associated with the SLS subscriber/calling party, called party, or the like may be rendered for the benefit of the user of such embodiments within the environment 100 and, as such, only describing that the CLID is displayed will not limit the scope of what is envisioned by the disclosure.

In FIG. 1, the environment 100 is illustrated as including an AIN with switches that are interconnected by a network of voice channel lines known as trunks. Trunks are the voice channel circuits that interconnect the central office switches to connect voice-channel communications. The term "communication" includes all messages or communications that may be exchanged between two pieces of terminating equipment. Although the terminating equipment is illustrated as telephones, those skilled in the art will understand that terminating equipment may include other TDs, such as wireless telephones, $TD_2$ 112 and $TD_3$ 114 accessed through a mobile telephone switching office ("MTSO") 124, facsimile machines, computers, modems, etc.

As is understood by one of ordinary skill in the art, each piece of terminating equipment in a telecommunications network is preferably assigned a directory number. The term "directory number" is used herein in a manner consistent with its generally understood meaning of a number that is dialed or input by a calling party at an originating station to reach a terminating destination. A directory number, typically a seven or ten-digit number in the United States, is commonly referred to as a "telephone number." For example, $TD_1$ 110 is associated with a primary telephone number assigned to it by a primary service provider. As such, a subscriber to an SLS offered through an exemplary embodiment operating within environment 100 may initiate communications from $TD_1$ 110 that are associated with and/or directed to either the primary telephone number provided by the primary service provider or the secondary telephone number ("SLS telephone number") provided, serviced and or facilitated by the second line service provider.

Notably, depending on the particular embodiment, the primary service provider and the second line service provider may be the same entity or different entities. In embodiments where the primary service provider and the second line service provider are different entities, the subscriber may receive separate billing records from each entity. However, it is envisioned that within certain embodiments where the primary service provider and the second line service provider are not one and the same, that the providing entities may take advantage of session initiated protocols ("SIP") to simplify billing records for the user. Additionally, depending on the particular embodiment, the subscriber to an SLS offered through an exemplary system operating in exemplary environment 100 may also receive communications from a third party's TD that are directed to either the subscriber's primary telephone number or the SLS telephone number.

In general, any communication directed from either the primary telephone number or the SLS telephone number of a subscriber's $TD_1$ 110, an originating station, is routed to a third party TD like $TD_2$ 112, $TD_3$ 114 or $TD_N$ 116, a terminating destination, by way of a telecommunications system, such as the illustrated components operating within the exemplary environment 100. Notably, the exemplary environment 100 envisions any and all networks for transmitting and terminating communications between TDs such as, but not limited to, cellular networks, PSTNs, cable networks and the Internet. Notably, while the use of any particular protocol or communications standard may be a novel aspect of a particular embodiment disclosed herein, it will be understood that the scope of the embodiments is not limited to the use of any particular protocol or combination of protocols.

Methods for effecting the transmission of data through environment 100 including communication setups, terminations, etc. are understood by those of ordinary skill in the relevant art, and they may include the use of protocols and standards such as, but not limited to, signaling system seven ("SS7") protocol suite, SIP, customized applications for mobile networks enhanced logic ("CAMEL") or CAMEL Application Part ("CAP"), remote operations service element ("ROSE"), Voice Over IP ("VOIP"), etc. As one of ordinary skill in the relevant art would recognize, CAMEL Application Part (CAP) is a user protocol that rides on top of the Transaction Capabilities Application Part ("TCAP") of the SS7 protocol suite. Embodiments of the second line services may use combinations of SIP, CAP, ISUP and/or other protocols to connect calls between calling and called parties on a mobile device network.

Routing a communication from the originating station to the terminating destination involves the selection of a routing path for the communication and may also involve the implementation of one or more advanced network functions. The ability of a typical SSP to provide these advanced network functions, however, is limited due to physical and other constraints. The AIN therefore provides for increased information processing capability through a system of intelligent network elements that are functionally connected with the SSPs through a network of data links.

These intelligent network elements of the AIN can communicate with each other, and with the SSPs of the network, via digital data messages transmitted over the network of digital data links. An SSP may be configured to interface with these intelligent network elements through the use of a "trigger." In general, a trigger serves as an indicator for the SSP to take certain action. The SSP is configured so that, when the SSP detects a predetermined set of conditions defining the trigger in association with a communication, the SSP creates an appropriate digital data message for transmission over the network of digital data links. The SSP may also suspend routing of the communication (i.e., hold the communication) until the SSP receives a reply to its message from an appropriate network element instructing the SSP to take a certain action. If the SSP receives no instructions within a certain amount of time, the SSP may "time-out" and execute a default task for the communication.

The message created by an SSP in response to a trigger is known as a "query" message. A query message opens a "transaction" and the SSP generally holds the communication while the transaction remains open. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating destination. A trigger is typically activated or deactivated at an SSP by another network element through an "update" message. Query messages, conversation messages, response messages, and update messages are standard types of messages defined by the AIN protocol. The details of the AIN protocol are well known to those of ordinary skill in the relevant art.

In an exemplary embodiment, the originating switch 122 can be an SSP switch. It is noted, however, that the AIN may also include non-SSP central office switches (not shown). It will be appreciated that a non-SSP switch may initially receive a communication from a subscriber line, such as when the subscriber is roaming on a foreign telecommunications network, and pass the communication to another switch, such as SSP 122, for further processing. Similarly, in a cellular or wireless network, an MTSO or other receiver/transmitter may initially receive a communication from a cellular telephone or wireless unit and route the communication to another network element, such as SSP 122, for further processing. In this manner, advanced network functions available through the AIN may be provided to wireless units and to subscriber lines that are directly connected to non-SSP switches, roaming on foreign networks, employing wireless devices, or any combination thereof.

Each switch in the AIN is connected to a signal transfer point 126 via a data link. The signal transfer point 126 is a multi-port, high-speed packet switch that is programmed to respond to the routing information in the SS7 protocol and route the packet to its destination. Digital data messages flowing between the service control point 128 and the SSP 122 go through signal transfer point 126. Thus, the signal transfer point 126 is not normally a terminating destination; instead, it merely directs traffic among the other entities on the network that generate and respond to the data messages.

Much of the intelligence of the AIN resides in a one or more service control points 128 that are connected to the signal transfer point 126 by a SS7 data link. A service control point 128 is a remotely programmable intelligent network element. As is known to those of ordinary skill in the relevant art, a service control point is physically implemented by relatively powerful fault tolerant computers. Among the functions performed by a service control point is the maintenance of network databases, such as database 130, which is used in providing subscribers with advanced network functions.

Additional devices for implementing advanced network functions within the AIN are provided by a service management system 132. The service management system 132 is connected via a data link to the service control point 128. The service management system 132 provides a centralized platform for remotely programming the service control point 128 so that a coordinated information-processing scheme may be implemented for the AIN. The service management system 132 is implemented by a large general-purpose computer and interfaces to business offices of the local exchange carrier and inter-exchange carriers. The functions of the service management system 132 include: (a) downloading information to the database 130 when new subscribers are added or when subscribers modify their ensemble of services; (b) performing data reloads when the service control point 128 crashes or when software needs to be updated; (c) implementing high volume routing services, such as call forwarding and 800 number translation and routing; (d) maintaining and providing access to high volume databases for the authorization of billing, such as credit card number validations; and (e) downloading, on a non-real-time basis, billing information that is needed in order to appropriately invoice telephone company subscribers for the services provided.

As illustrated in FIG. 1, the AIN also includes a service node 134, which may also be referred to as a service circuit node. The service node 134 includes voice and dual tone multi-frequency ("DTMF") signal recognition devices and voice synthesis devices. The service node 134 communicates with the service control point 128 via a data link using X.25 or TCP/IP protocols, and to the service management system 132 via another data link. In addition, the service node 134 typically is connected to one or more (but usually only a few) SSPs via Integrated Service Digital Network ("ISDN") links, as shown by the connection 136 to the service switching point 122.

The AIN thus provides subscribers with a selectable menu of advanced network functions. These advanced network functions are typically sold on a per-service basis, or in groups of services known as calling plans. Each subscriber may select a set of advanced network functions, or a calling plan that suits the subscriber's needs. Moreover, each subscriber may generally select among a plurality of local advanced network functions, as well as select among a plurality of long distance/roaming advanced network functions.

Cellular, wireless digital or mobile communication networks are similarly situated to provide intelligent features similar to what are available through the AIN or, in conjunction with components of the AIN. In addition, a PBX 150 connected to the telecommunications network such as through a service switching point 122 or even an MTSO or other point of entry may also operate to provide some or all aspects of an embodiment of the SLS while servicing stations S1 152 and SN 154.

Thus, referring back to FIG. 1, which depicts an environment 100 suitable for providing or housing an embodiment of an SLS to service $TD_1$ 110, those familiar with telecommunications networks will appreciate that an SLS can be provided, at least on some embodiments, as an advanced network function accomplished by the novel and nonobvious method enabled and described by this disclosure. When an SLS subscriber wishes to initiate a communication from their $TD_1$ 110 to a third party $TD_N$ 116 using their SLS number instead of their primary telephone number, the subscriber dials a predefined prefix in addition to the directory number of $TD_N$ 116. In another embodiment, rather than a prefix, a predefined suffix or simply a predefined sequence that may be incorporated into the beginning, end or embedded within a directory number or transmitted via a different channel may be used instead. Regardless, this dialed sequence, being part of the data that makes up the communication in some embodiments, includes the prefix, suffix or predefined sequence and it operates as a trigger for the SSP 122.

When the SSP 122 intercepts the communication, it is configured to search for the trigger in the received communication. Because the communication from $TD_1$ 110 includes the predefined trigger for the SSL, the SSP 122 then creates a "query" message for transmission to the SLS Platform 138. When the SLS Platform 138 receives the "query" message, the SLS Platform 138 creates a reply message for transmission back to the SSP 122 as it is configured to do. The SLS platform 138 is configured to provide the necessary information for routing the communication using the SLS. In this particular embodiment, transmission of these messages is performed using the CAP portion of the SS7 protocol suite. In other embodiments, and as described more fully above, the particular protocol or communications standard may be ROSE, VOIP, or any other similar standard known to those skilled in the art.

The reply message contains the information necessary for the SSP 122 to implement the SLS. In typical embodiments, the reply message may contain the information/instructions necessary to properly route the communication to the terminating destination $TD_N$ 116 at the directory number included in the dialed sequence. However, in other embodiments, the reply message may additionally contain the information/instructions necessary for further processing of the communication, such as verifying that the subscriber $TD_1$ 110 is authorized to use the advanced network functions, like the SLS, and supplementing/supplanting data within the communication. For example, the reply message may additionally contain instructions for the SSP 122 indicating which of the subscriber's CLIDs (either its primary directory number or its SLS number, etc.) should be populated for display on the called party's $TD_N$ 116.

Figure 2:
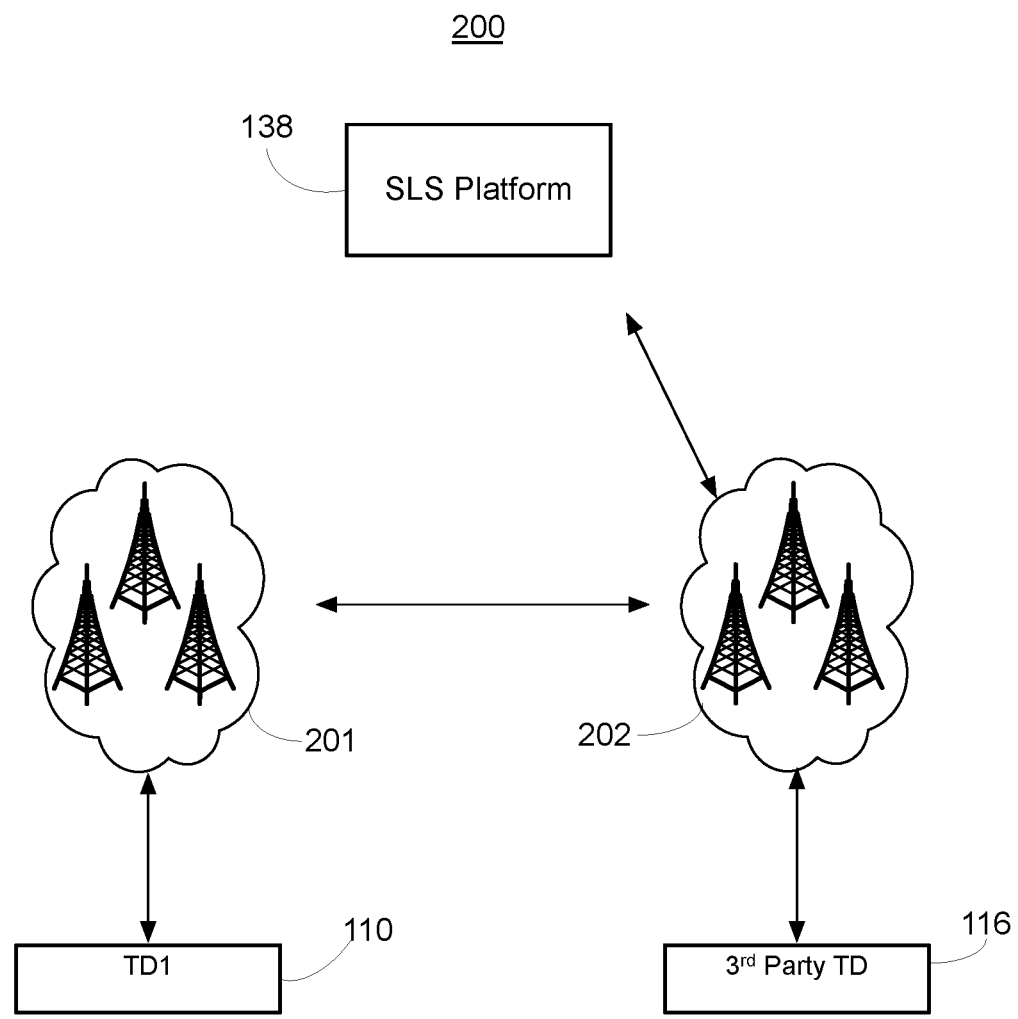
FIG. 2 is a high level diagram illustrating an exemplary environment for a global telecommunications network wherein a subscriber to a second line service can roam on a foreign telecommunications network.

FIG. 2 is a high level diagram illustrating of an exemplary global telecommunications network wherein a subscriber to a second line service can roam on a foreign telecommunications network. The exemplary global telecommunications network 200 includes a subscriber $TD_1$ 110 and a third party $TD_N$ 116; although, it is possible that others TDs like $TD_2$ 112 and $TD_3$ 114 may be included as well. Notably, although the $TD_N$ 116 is not illustrated to suggest it, it is envisioned that in some embodiments, both the subscriber $TD_1$ 110 and the third party $TD_N$ 116 may be SLS enabled. For exemplary purposes the subscriber $TD_1$ 110 is depicted as being SLS enabled and the third party $TD_N$ 116 is depicted as not having a second line service associated with it. Other combinations of primary line services and SLS for each of $TD_1$ 110 and $TD_N$ 116 are envisioned.

Additionally, it is envisioned that TDs like $TD_1$ 110 and $TD_N$ 116 are capable of roaming from their home AIN, like the environment 100 depicted in FIG. 1, to another telecommunications network by methods and systems known to those of ordinary skill in the relevant art. In this way, TDs like $TD_1$ 110 and $TD_N$ 116 can travel outside of their home AINs and continue utilizing their advanced network functions and calling plans. As such, for purposes of FIG. 2, AIN 202 represents the home AIN for $TD_1$ 110 and $TD_N$ 116. AINS 202 is essentially the same system 100 described by FIG. 1. On the other hand, telecommunications network 201 represents any telecommunications network on to which $TD_1$ 110 can roam.

When an SLS subscriber wishes to initiate a communication from their $TD_1$ 110 to a third party $TD_N$ 116 using their SLS number instead of their primary telephone number, and the subscriber is roaming on telecommunications network 201, the subscriber dials the dialed sequence including the trigger as described above. Because the $TD_1$ 110 is roaming, the telecommunications network 201 ultimately intercepts the communication at one of its switches or MTSOs. The telecommunications network 201 does not inherently recognize the foreign $TD_1$ 110 roaming on its network, so it does not have the necessary information to determine how to process $TD_1$ 110's communication and the embedded trigger.

As such, the telecommunications network 201 sends a "query" message to the home AIN 202 of $TD_1$ 110 for purposes of getting instructions on how to process $TD_1$ 110's communication and the embedded trigger. Consequently, the telecommunications network 201 creates a "query" message for transmission to AIN 202 through the SS7 protocol suite, specifically the CAP portion of the protocol, as it is programmed to do. In other embodiments, the particular protocol or communications standard may be ROSE, VOIP, or any other similar standard known to those skilled in the art. It is known by those skilled in the art that message exchanges between a "roamed to network" and a home network can occur through various intermediary network elements.

Regardless of the string of intermediary network elements involved in between the telecommunications network 201 and AIN 202, eventually an SSP, like SSP 122 in FIG. 1, on AIN 202 receives the "query message." Like FIG. 1, the SSP on AIN 202 searches for the trigger in the communication as it is programmed to do. Because the communication from $TD_1$ 110 includes the predefined trigger for the SLS, the SSP on AIN 202 functions as an intermediary as the communication is processed using SLS Platform 138. Like FIG. 1, SLS Platform 138 creates a reply message for transmission back to the SSP on AIN 202 that is ultimately relayed back to the telecommunications network 201. Transmission of these messages, including any messages between intermediary network elements, is performed using the SS7 protocol suite, specifically the CAP portion of the protocol. In other embodiments, the particular protocol or communications standard may be ROSE, VOIP, or any other similar standard known to those skilled in the art.

Like FIG. 1, the reply message contains the information necessary for the telecommunications network 201 to implement the SLS. In some embodiments, the reply message may contain the information/instructions necessary to properly route the communication to the terminating destination $TD_N$ 116 at the directory number included in the dialed sequence. However, in another embodiment, the reply message may additionally contain the information/instructions necessary for further processing of the communication, such as verifying that the subscriber $TD_1$ 110 is authorized to use the telecommunications network 201 when roaming, verifying that the subscriber $TD_1$ 110 is authorized to use the advanced network functions, such as SLS, on AIN 201, and supplementing/supplanting data within the communication. For example, the reply message may additionally contain instructions for the telecommunications network 201 indicating which of the subscriber's CLIDs (either its primary directory number or its SLS number, etc.) should be populated for display on the called party's $TD_N$ 116.

Figure 3:
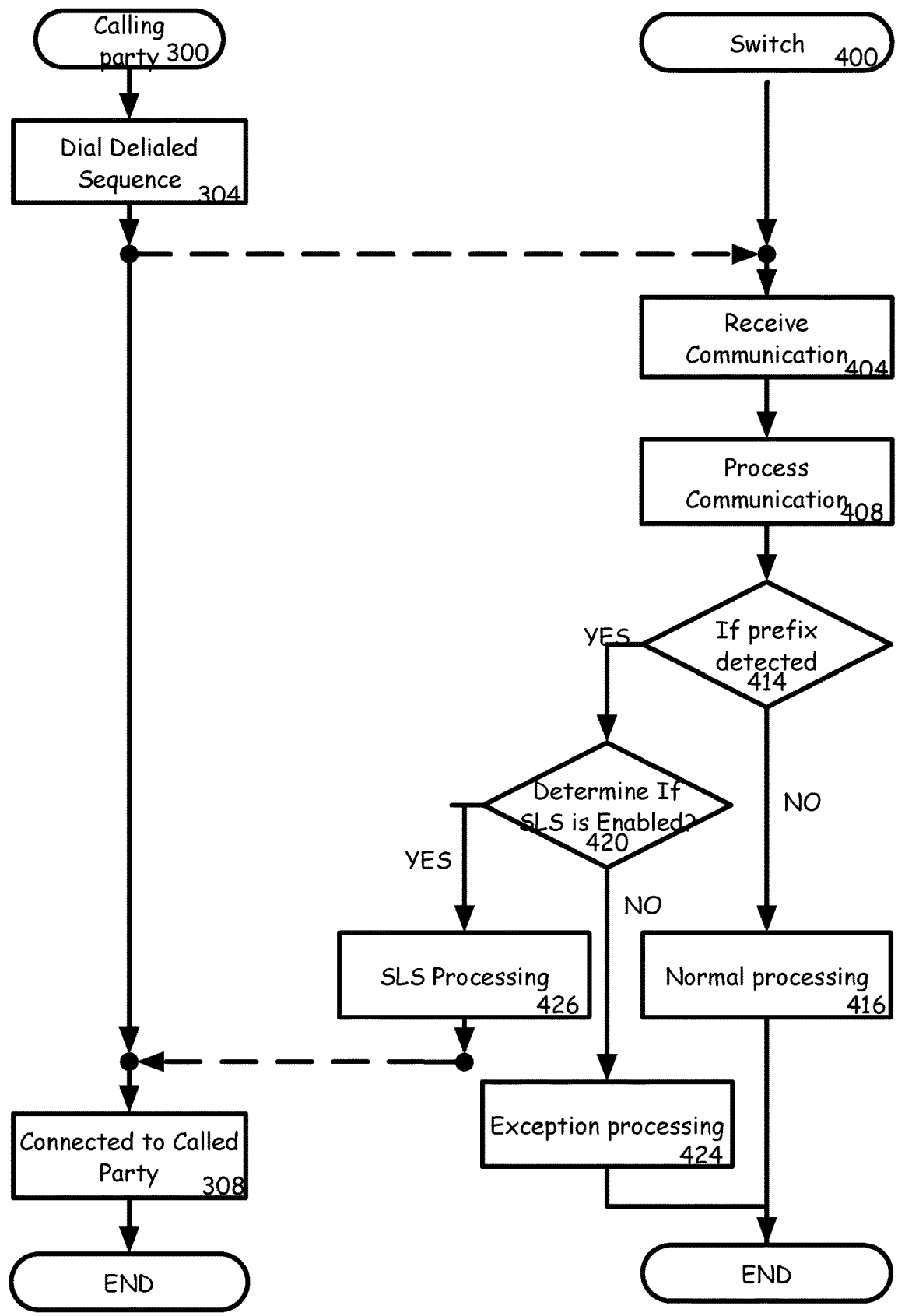
FIG. 3 is a flow diagram illustrating actions included in an exemplary embodiment of the second line service.

FIG. 3 is a flow diagram illustrating actions included in an exemplary embodiment of the SLS. FIG. 3 shows an embodiment from two perspectives, the view of the calling party 300 and the view of the switch 400. In the illustrated embodiment, the flow is initiated by a calling party 300 dialing a special sequence or command and a directory number 304. For instance, the calling party 300 may dial *32 (or any other prefix) followed by a 10 digit telephone number, or the calling party 300 may dial a 10 digit telephone number followed by a suffix (i.e. *32, #45, etc.). The process of dialing is not limited to pressing buttons on a telephone device but rather, may include recalling a number from memory and selecting that number, or having a computer or processing unit dial or send the desired dialed sequence. In addition, in some embodiments voice commands can be utilized to control or invoke and SLS call, specialized hard or soft buttons can be included on the TD, etc.

Further, rather than a prefix of suffix, in some embodiments a special area code or telephone number may be used to identify the intention to use and SLS number. For instance, the dialed number may be 999-xxx-xxxx, where 999 signals the use of a second line number and the 7 digit number can be looked up in the subscriber's database to identify the appropriate area code. Moreover, one of ordinary skill in the art will recognize that telephone numbers, although generally described in this disclosure as possibly including a specific country code, area code, and seven digit directory number, may include any country code, area code and directory number system known to those skilled in the art.

The communication containing or associated with the dialed sequence then propagates to the switch 400, such as SSP 122 from FIG. 1, where the communication is received 404. The received communication is then analyzed, processed, parsed and/or otherwise interpreted for call setup and routing 408 and to determine the presence of a trigger (such as the prefix, suffix or other indication) to initiate an SLS based call. If the switch 400 does not detect that the received communication includes the special sequence (or trigger) 412, then normal processing is performed for the communication 416. However, if the switch 400 does detect that the received communication includes the special sequence 412, then the switch 400 is programmed to determine if the communication is enabled for SLS 420, as described above and depicted in FIG. 1 and FIG. 2.

If the switch 400 determines that the communication is not enabled for SLS 420, then exception processing can be performed 424, which may be limited to or include simply performing normal processing 416. However, if the switch 400 determines that the communication is enabled for SLS, then the switch 400 performs SLS processing for the communication 426 and thus completes the call from the calling party to a TD associated with the dialed directory number. From the calling party's perspective, the communication is directly connected to the called party 308.

Figure 4:
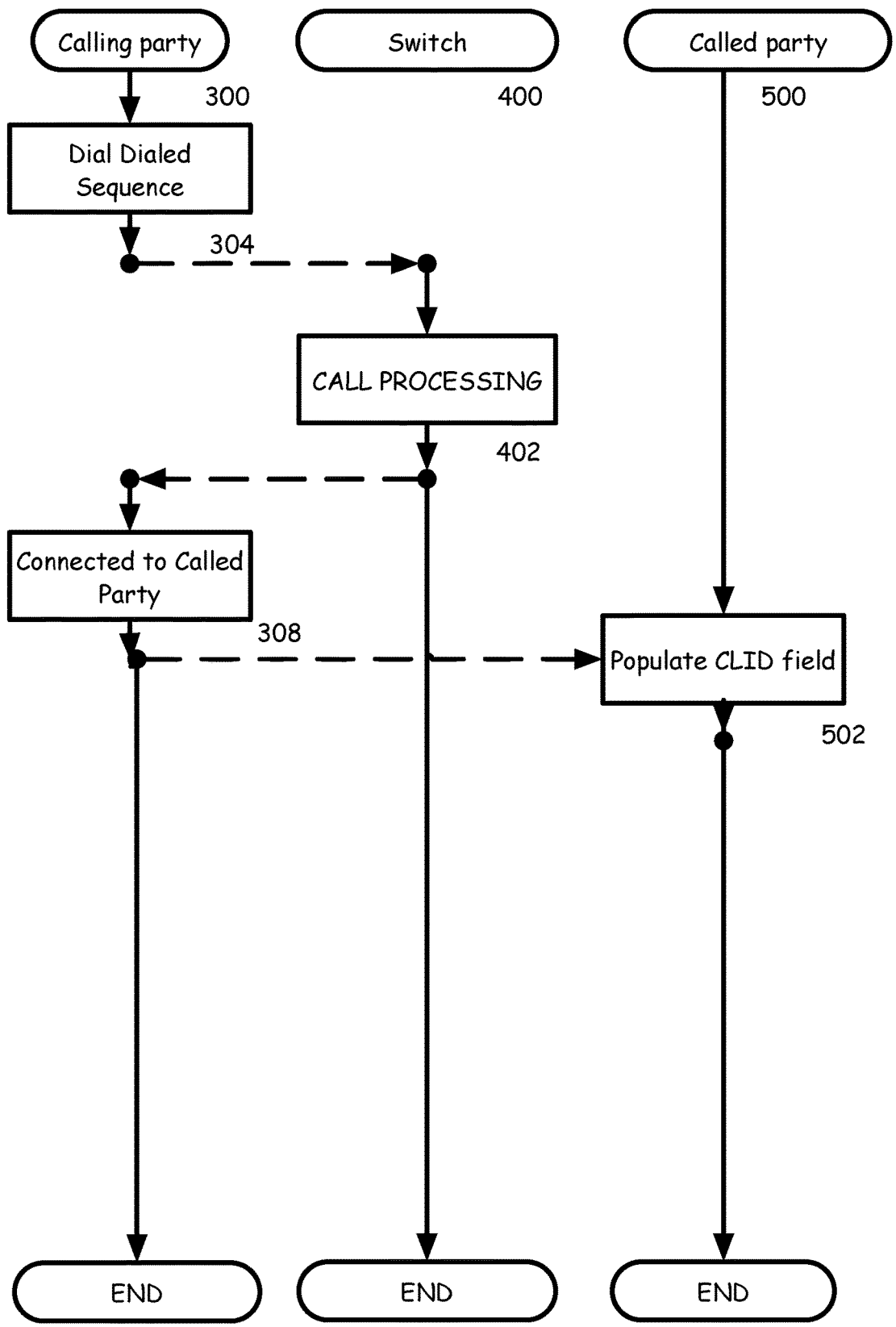
FIG. 4 is a flow chart illustrating actions included in an exemplary embodiment of the SLS, focusing on the operation of an embodiment from the calling party's and the called party's perspective.

FIG. 4 is a flow chart illustrating actions included in an exemplary embodiment of the SLS, focusing on the operation of an embodiment from the calling party's and the called party's perspective. In FIG. 4, the calling party 300 dials the dialed sequence 304 as illustrated in FIG. 3 and the switch 400 processes the call 402. In some embodiments, once the calling party is connected to the called party 500, the called party's TD CLID field can be populated with the calling party's SLS number or other mechanisms may be used to alert or inform the called party with regards to the SLS of the calling party 300.

In the reverse direction, if a third party calls a subscriber by using the subscriber's SLS number, then the switch 400 receives the call and determines that the number is to be serviced by the SLS platform (i.e., the SLS number is in a block of numbers or a list of numbers that are to be routed to an SLS platform for processing). The SLS platform can then have the switch initiate a call or complete the call to the subscriber's normal number (the number assigned to the subscriber's terminal device). In doing so, the SLS can cause the switch to include a special sequence with the digits sent to the subscriber's equipment to indicate that this is a call to the SLS number of the subscriber. The sequence can be in the form of a prefix, suffix, other embedded number or using a special area code or other similar techniques.

Certain actions or blocks in the processes or process flows described in this specification naturally precede others for the embodiment to function as described. However, the various embodiments are not limited to the order of the actions or blocks as presented or described. That is, it is recognized that some actions or blocks may be performed before, after, or in parallel (substantially simultaneously with) other actions or blocks without departing from the scope and spirit of the various embodiments. In some embodiments, certain actions or blocks may be omitted or not performed as not all embodiments necessarily must implement all of the described actions. Also, in some embodiments, multiple actions depicted and described as unique actions or blocks in the present disclosure may be comprised within a single step or block. Further, words such as "thereafter", "then", "next", "subsequently", etc. are not intended to limit the order of the actions or blocks. These words are simply used to guide the reader through the description of the exemplary method.

Additionally, one of ordinary skill in programming will be able to write computer code or identify appropriate hardware and/or circuits to implement the various embodiments, as well as features and aspects thereof, based on the flow charts and associated description in this specification. Therefore, disclosure of a particular set of program code instructions or detailed hardware devices is not considered necessary for an adequate understanding of how to make and use the various embodiments. The functionality of the claimed computer implemented processes is explained in more detail in the above description and in conjunction with the Figures that may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, acoustic and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for enabling a single mobile device having a single SIM card to operate as though it has multiple SIM cards and thus emulating multiple mobile devices, the method comprising the actions of:
   receiving a communication at a network switch, the communication being sent by a mobile device having: a cellular service provider recognized SIM card, wherein the SIM card is associated with a cellular service provider number; and a plurality of second line service numbers (SLS), the communication including a first network recognizable number and the cellular service provider number;
   the network switch, querying an advanced network function with the first network recognizable number and the cellular service provider number;

receiving at the network switch a reply to the query message directly from the advanced network function, the reply including an SLS number selected from the plurality of SLS numbers to be identified as an originating number for the communication and a second network recognizable number associated with a termination device as a destination for the communication, wherein the SLS number and the second network recognizable number are selected by the advanced network function based on the first network recognizable number and the cellular service provider number; and the network switch routing the communication by connecting through the network switch, a voice channel circuit to the termination device and populating a Caller Identification (CLID) with the SLS number.

2. The method of claim 1, wherein the action of querying the advanced network function comprises the actions of:

creating the query message that includes the first network recognizable number, the cellular service provider number and a request to interpret the first network recognizable number in view of the cellular service provider number;

sending the query to the advanced network function; and the network switch pausing further processing of the communication until the network switch receives the reply to the query message from the advanced network function.

3. The method of claim 2, wherein the advanced network function, in response to receiving the query from the network switch, performs the actions of:

selecting an SLS number and second network recognizable number pair by using the first network recognizable number and the cellular service provider number;

creating a response to the query, wherein the response includes the selected SLS number and the second network recognizable number; and sending the response to the network switch as a reply to the query.

4. The method of claim 3, wherein the network switch is an SSP switch within a Public Switched Telephone Network (PSTN), and the action of querying the advanced network function further comprises bypassing any interaction with a Service Control Point (SCP) within the PSTN.

5. The method of claim 1, wherein subsequent to the termination device or the mobile device dropping connection between the termination device and the mobile device, the termination device can originate a communication to the received SLS number;

in response to the network switch receiving the termination device originated communication, the network switch determines that the SLS number is to be serviced by the advanced network function; and the advanced network function then causes the network switch to complete the call to the mobile device by directing the communication to the service provider number of the mobile device and providing a special sequence to be sent of the mobile device to indicate that this is a call to the SLS number.

6. A system for enabling a single mobile device to emulate multiple mobile devices, the system comprising:

a mobile device having a single SIM card issued by a cellular service provider, wherein the single SIM card is associated with a cellular service provide number, and wherein the mobile device is associated with one or more second line service (SLS) numbers;

a network switch operating within a telecommunications network and communicatively coupled to the mobile device such that, a communication originating from the mobile device that includes a first network recognizable number and the cellular service provider number is received by the network switch;

an advanced network function that is accessible by the network switch, wherein in response to the network switch sending a query to the advanced network function, wherein the query identifies the first network recognizable number and the cellular service provider number, the advanced network function identifies an SLS number to serve as the originating number of the communication and a second network recognizable number that operates as a destination number for the communication and provides the SLS number and the destination number to the network switch; and the network switch including a communication processor that, in response to receiving the SLS number and the destination number from the advanced network function, is configured to communicatively connect the mobile device with the terminal device associated with the destination number and populate a Caller Identification (CLID) for the communication with the SLS number.

7. The system of claim 6, wherein the advanced network function is a platform that is communicatively coupled to the Public Switched Telephone Network (PSTN).

8. The system of claim 7, wherein the network switch is a Service Switching Point (SSP) within the PSTN.

9. The system of claim 8, wherein SSP is communicatively coupled to the platform such that the SSP is able to bypass a service control point in the PSTN when sending the query to the platform.

* * * * *